(12) United States Patent
Liu et al.

(10) Patent No.: US 11,313,760 B2
(45) Date of Patent: Apr. 26, 2022

(54) DEVICE AND METHOD FOR MEASURING TRANSMITTANCE CURVE OF FABRY-PAROT USING WHISPERING GALLERY MODE LASER SOURCE

(71) Applicant: HEFEI INSTITUTE OF PHYSICAL SCIENCE, CHINESE ACADEMY OF SCIENCES, Anhui (CN)

(72) Inventors: Dong Liu, Anhui (CN); Yufei Chu, Anhui (CN); Yingjian Wang, Anhui (CN); Decheng Wu, Anhui (CN); Zhenzhu Wang, Anhui (CN); Kunming Xing, Anhui (CN); Zhiqiang Kuang, Anhui (CN); Bangxin Wang, Anhui (CN); Zhiqing Zhong, Anhui (CN); Aiyuan Fan, Anhui (CN); Chenbo Xie, Anhui (CN)

(73) Assignee: HEFEI INSTITUTE OF PHYSICAL SCIENCE, CHINESE ACADEMY OF SCIENCES, Anhui (CN)

(*) Notice: Subject to any disclaimer, the term of this patent is extended or adjusted under 35 U.S.C. 154(b) by 0 days.

(21) Appl. No.: 17/042,093

(22) PCT Filed: Jan. 9, 2020

(86) PCT No.: PCT/CN2020/071149
§ 371 (c)(1),
(2) Date: Sep. 26, 2020

(87) PCT Pub. No.: WO2021/036167
PCT Pub. Date: Mar. 4, 2021

(65) Prior Publication Data
US 2021/0364383 A1   Nov. 25, 2021

(30) Foreign Application Priority Data
Aug. 28, 2019   (CN) .......................... 201910800131.0

(51) Int. Cl.
*G01M 11/02* (2006.01)
*G01H 9/00* (2006.01)
(Continued)

(52) U.S. Cl.
CPC ........ *G01M 11/0285* (2013.01); *G01H 9/004* (2013.01); *G01J 3/26* (2013.01); *G01N 21/59* (2013.01)

(58) Field of Classification Search
CPC .................................................. G01M 11/0285
(Continued)

(56) References Cited

U.S. PATENT DOCUMENTS

| 8,928,889 B2* | 1/2015 | Tearney | A61B 5/0073 |
| | | | 356/479 |
| 9,291,547 B2* | 3/2016 | Liu | G01N 21/41 |

(Continued)

FOREIGN PATENT DOCUMENTS

| CN | 101267082 A | 9/2008 |
| CN | 102623880 A | 8/2012 |

(Continued)

OTHER PUBLICATIONS

First Office Action in counterpart Chinese Application No. 201910800131.0, dated Jun. 12, 2020.
(Continued)

*Primary Examiner* — Tarifur R Chowdhury
*Assistant Examiner* — Omar H Nixon

(57) ABSTRACT

Disclosed is a device and a method for measuring Fabry-Parot (FP) transmittance curve by using a whispering gallery mode laser source. The device includes: a seed laser, a first polarizer, a second polarizer, a spectroscope, a beam reduction system, a lens, and Polydimethylsiloxane (PDMS) microfluidic chip arranged in sequence.

3 Claims, 3 Drawing Sheets

(51) Int. Cl.
*G01J 3/26* (2006.01)
*G01N 21/59* (2006.01)

(58) Field of Classification Search
USPC .......................................................... 356/328
See application file for complete search history.

(56) References Cited

U.S. PATENT DOCUMENTS

| | | | |
|---|---|---|---|
| 9,441,948 B2* | 9/2016 | Vakoc | G01B 9/02072 |
| 10,413,175 B2* | 9/2019 | Yun | A61B 3/1233 |
| 2002/0108859 A1* | 8/2002 | Wang | G01N 15/1456 |
| | | | 204/547 |
| 2002/0175287 A1 | 11/2002 | Busch et al. | |
| 2014/0017700 A1* | 1/2014 | Fan | G01N 21/6428 |
| | | | 435/7.4 |
| 2018/0095060 A1* | 4/2018 | Fan | G01N 30/465 |

FOREIGN PATENT DOCUMENTS

| | | |
|---|---|---|
| CN | 102684043 A | 9/2012 |
| CN | 104040808 A | 9/2014 |
| CN | 104215331 A | 12/2014 |
| CN | 109738162 A | 5/2019 |
| CN | 110530609 A | 12/2019 |

OTHER PUBLICATIONS

International Search Report in corresponding PCT Application No. PCT/CN2020/071149, dated May 27, 2020.
Written Opinion of the International Searching Authority in corresponding PCT Application No. PCT/CN2020/071149, dated May 27, 2020.

* cited by examiner

DEVICE AND METHOD FOR MEASURING TRANSMITTANCE CURVE OF FABRY-PAROT USING WHISPERING GALLERY MODE LASER SOURCE

FIELD

This application relates to the field of optical technology, and particularly relates to a device and a method for measuring a transmittance curve of an Fabry-Parot (FP) by using a whispering gallery mode laser source.

BACKGROUND

The standard transmittance curve of F-P is a very important parameter for evaluating FP. Generally, the FP transmittance curve is measured by adjusting the wavelength of the incident light source, or adjusting the cavity length of the FP or the angle of the incident light, and methods such as frequency comb light sources are also proposed to measure the FP transmittance curve. However, laser sources with wavelength tuning function are very expensive, and it is difficult to find laser sources with a corresponding wide wavelength tuning range for some FPs with a wide free spectral range. FPs with adjustable cavity length are not only very expensive, but also difficult to control the adjustment accuracy. It is difficult to ensure that the change is linear with the method of tuning the wavelength of the incident light source and the angle of the incident light, which leads to the introduction of new errors each time the step length changes, and ultimately leads to insufficient measurement accuracy. The price of frequency comb laser source is still very expensive at present, which is not conducive to popularization and use in a large area.

SUMMARY

The purpose of this application is to provide a device and method for measuring FP transmittance curve using a whispering gallery mode laser source, which may completely solve the above-mentioned shortcomings of the prior art.

The purpose of this application is achieved through the technical solutions as follows.

A device for measuring a transmittance curve of an FP by using a whispering gallery mode laser source, including: a seed laser, a first polarizer, a second polarizer, a spectroscope, a beam reduction system, a lens, and a Polydimethylsiloxane (PDMS) arranged in sequence; the spectroscope is corresponded to an energy meter; the PDMS (microfluidic substrate) is correspondingly provided with a first spectrometer; one end of the PDMS is preset with a first optical fiber, and the other end of the PDMS is preset with a second optical fiber; laser through the lens is focused to an end surface of the first optical fiber; the second optical fiber is corresponded to a collimator, the collimator is corresponded to a first beam splitter, the first beam splitter is corresponded to a second beam splitter and an aperture, respectively, the second beam splitter is corresponded to a second spectrometer and a first detector, respectively, the aperture is corresponded to an FP, the FP is corresponded to a third beam splitter, and the third beam splitter is corresponded to a second detector and a third spectrometer, respectively.

The beam reduction system is composed of a first lens and a second lens.

A method for measuring a transmittance curve of an FP using a whispering gallery mode laser source, using the device for measuring the transmittance curve of the FP using the whispering gallery mode laser source, including: passing, laser emitted by the seed laser with a single frequency through the first polarizer and the second polarizer to adjust polarization of incident light; passing, the laser, through the spectroscope to split a beam of light into the energy meter for monitoring energy of the incident light; passing, the laser from the spectroscope through the beam reduction system composed of the first lens and the second lens and through the lens to be focused on the end surface of the first optical fiber, where the first optical fiber is preset into the PDMS, the PDMS is added with required dye, light propagating in the whispering gallery mode in the first optical fiber is configured to generate whispering gallery mode laser by gain of the dye; monitoring, by the first spectrometer, the generated laser; in a determination that the generated laser is required whispering gallery mode laser, passing, the generated laser, through the second optical fiber into a beam expansion system; splitting, by the first beam splitter, the generated laser into beam A1 and beam A2; splitting, by the second beam splitter, the beam A2 into beam B1 and beam B2; detecting, by the second spectrometer, a frequency component of the beam B2; receiving, by the first detector, energy of the beam B1; passing, the beam A1, through the aperture and the FP; splitting, by the third beam splitter, the beam A1 into beam C1 and beam C2; detecting, by the third spectrometer, a frequency component of the beam C2; receiving, by the second detector, the beam C1, and measuring, by the second detector, energy of the beam C1; using energy changes of the first detector and the second detector for calibration; comparing relative energy changes of corresponding frequency components before and after the FP to obtain transmittance of corresponding frequency; and fitting each frequency component through a polynomial to obtain a transmission curve.

Compared with the prior art, this application has beneficial effects as follows.

This application provides a device and a method for measuring a transmittance curve of an FP etalon by using a laser source of a whispering gallery mode in a microfluidic chip. Since the whispering gallery mode light source may have multiple frequency components, although the frequency intervals are not completely equal, they are relatively accurately determined, so the transmittance curve of the FP etalon may be measured at one time, avoiding the above-mentioned defects. Based on the advantages of microfluidics, the frequency interval and spectral range of the light source are adjustable, and the cost is very low compared to other methods. This method greatly reduces the cost of measuring the transmittance curve, and improves the measurement accuracy and effectiveness.

DETAILED DESCRIPTION OF THE EMBODIMENTS

Figure 1:
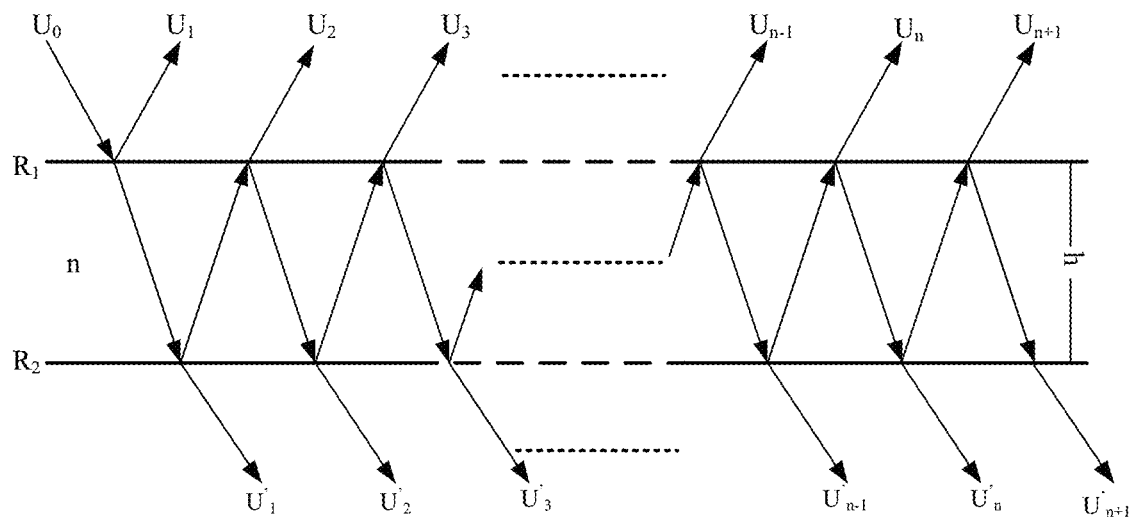
FIG. 1 is a schematic diagram of transmittance of an FP interferometer.

This application will be further described below in conjunction with specific embodiments and drawings.

Embodiment 1

As shown in FIGS. 1 to 5, a device for measuring a transmittance curve of an FP by using a whispering gallery mode laser source includes a seed laser, a first polarizer 1, a second polarizer 2, a spectroscope 0, a beam reduction system, a lens 3 and a PDMS (microfluidic substrate). The spectroscope 0 is corresponded to an energy meter (that is, a detector 0), and the beam reduction system is composed of a lens 1 and a lens 2. The PDMS is correspondingly provided with a first spectrometer 0. One end of the PDMS is preset with a first optical fiber 1, and the other end of the PDMS is preset with a second optical fiber 2. An end surface of the first optical fiber 1 is corresponded to the lens 3. The second optical fiber 2 is corresponded to a collimator, and the collimator is corresponded to a first beam splitter 1 (or called a spectroscope). The first beam splitter 1 is corresponded to a second beam splitter 2 and an aperture, respectively. The second beam splitter 2 is corresponded to a second spectrometer 1 and a first detector 1, respectively. The aperture is corresponded to an FP (FP etalon). The FP is corresponded to a third beam splitter 3. The third beam splitter 3 is corresponded to a second detector 2 and a third spectrometer 2, respectively.

A method for measuring a transmittance curve of an FP using a whispering gallery mode laser source, including the above-mentioned device for measuring the transmittance curve of the FP using the whispering gallery mode laser source, including: passing, laser emitted by the seed laser with a single frequency through the first polarizer and the second polarizer to adjust polarization of incident light; passing, the laser, through the spectroscope to split a beam of light into the energy meter for monitoring energy of the incident light; passing, the laser from the spectroscope through the beam reduction system composed of the lens 1 and the lens 2 and through the lens 3 to be focused on the end surface of the first optical fiber, where the first optical fiber is preset into the PDMS, the PDMS is added with required dye, light propagating in the whispering gallery mode in the first optical fiber is configured to generate whispering gallery mode laser by gain of the dye; monitoring, by the first spectrometer, the generated laser; in a determination that the generated laser is required whispering gallery mode laser; passing, the generated laser, through the second optical fiber into a beam expansion system; splitting, by the first beam splitter, the generated laser into beam A1 and beam A2; splitting, by the second beam splitter, the beam A2 into beam B1 and beam B2; detecting, by the second spectrometer, a frequency component of the beam B2; receiving, by the first detector, energy of the beam B1; passing, the beam A1, through the aperture and the FP; splitting, by the third beam splitter, the beam A1 into beam C1 and beam C2; detecting, by the third spectrometer, a frequency component of the beam C2; receiving, by the second detector, the beam C1, and measuring, by the second detector, energy of the beam C1; using energy changes of the first detector and the second detector for calibration; comparing relative energy changes of corresponding frequency components before and after the FP to obtain transmittance of corresponding frequency; and fitting each frequency component through a polynomial to obtain a transmission curve.

This application provides a device and a method for measuring a transmittance curve of an FP etalon by using a laser source of a whispering gallery mode in a microfluidic chip. Since the whispering gallery mode light source may have multiple frequency components, although the frequency intervals are not completely equal, they are relatively accurately determined, so the transmittance curve of the FP etalon may be measured at one time, avoiding the above-mentioned defects. Based on the advantages of microfluidics, the frequency interval and spectral range of the light source are adjustable, and the cost is very low compared to other methods. This method greatly reduces the cost of measuring the transmittance curve, and improves the measurement accuracy and effectiveness.

Embodiment 2

The purpose of this application is to provide a device and a method for measuring a transmittance curve of an FP using a whispering gallery mode laser source, which may completely solve the above-mentioned shortcomings of the prior art.

Term explanation: Whispering Gallery Mode (WGM): in acoustics, the principle of "whispering" in the whispering gallery is that a circular wall continuously reflects sound waves, so there must be a certain distance from the wall when speaking. The whispering wall is the outer wall of Emperor Qiongyu. The opposite seams of the ground bricks constructed on the wall are very smooth, and are a good sound carrier, which may transmit sound with minimal loss of sound during transmission. In the optical field, the whispering gallery mode in the optical fiber has similar characteristics.

The standard transmittance curve of the F-P is a very important parameter. Generally, the transmittance curve of the FP etalon is measured by adjusting the wavelength of the incident light source, or adjusting the cavity length of the FP or the angle of the incident light, and methods such as frequency comb light sources are also proposed to measure the transmittance curve of the FP. However, the above methods are either expensive in equipment or difficult to find the required parameters. Moreover, it is difficult to ensure that the change is linear regardless of the tuning of the wavelength or the angle of the incident light, and each change of the step size will introduce a new error, which ultimately leads to insufficient measurement accuracy. This application provides a method for measuring a transmittance curve of an FP etalon based on a whispering gallery mode laser source in a microfluidic chip. The microfluidic chip has a small structure and is basically low; the sound wall mode may provide a variety of frequency components. Although the frequency intervals are not completely equal, they are relatively accurately determined, so the transmittance curve of the FP etalon may be measured at one time. Based on the structure of the microfluidic chip, the frequency interval and spectral range of the laser source are adjustable, avoiding the defects of other methods mentioned above. The method combines the technology of the microfluidic chip, reduces the volume, improves the measurement accuracy and reduces the cost, and has good theoretical and practical value.

Fabry-Parot etalon is an interferometer, referred to as FP etalon or directly referred to as FP, which is mainly composed of two flat glass or quartz plates. It may be used as a high-resolution filter or a precision wavelength meter for high-resolution spectral analysis. In the laser system, it is usually used to shrink the line in the cavity or make the laser system work in a single mode. It may be used as a medium bandwidth control and tuning device for broadband picosecond lasers. It may also be widely used as a frequency discriminator in Doppler wind measurement or aerosol detection of lidar. Due to the wide application of FP etalon, the standard transmittance curve of F-P is a very important parameter. Generally, the transmittance curve of the FP etalon is measured by adjusting the wavelength of the incident light source or the angle of the incident light. However, laser sources with wavelength tuning function are very expensive, and it is difficult to find laser sources with a corresponding wide wavelength tuning range for some FP etalons with a wide free spectral range. In addition, the tuning of the wavelength and the angle of the incident light are both nonlinear, and the measurement accuracy is insufficient. This application provides a method for measuring the transmittance curve of the FP etalon using a frequency comb light source. Since the frequency comb light source has multiple frequency components with equal frequency intervals, it may measure the transmittance curve of the FP etalon at one time. And the frequency interval and spectral range are adjustable, avoiding the above-mentioned defects. This method greatly reduces the cost of measuring the transmittance curve, improves the measurement accuracy and effectiveness, and has good theoretical and practical value.

1) Working Principle of FP and Common Transmittance Test Method of FP

An ordinary etalon consists of two parallel reflecting surfaces. When plane beam $U_0$ is incident on the etalon, it will be continuously reflected and transmitted on the two reflecting surfaces. As shown in FIG. 1, amplitude reflectance of the two reflecting surfaces are $R_1$ and $R_2$ respectively, refractive index of medium between the two reflecting surfaces is n, medium thickness is h, and incident angle of $U_0$ is $\theta$.

amplitudes of the transmitted beams are:

$$U_1' = U_0(1-R_1)(1-R_2);$$

$$U_2' = U_0(1-R_1)(1-R_2)R_1R_2e^{i\delta};$$

$$U_3' = U_0(1-R_1)(1-R_2)R_1^2R_2^2e^{2i\delta};$$

$$U_4' = U_0(1-R_1)(1-R_2)R_1^3R_2^3e^{3i\delta};$$

. . . .

where, $$\delta = \frac{4\pi nh \cos\theta}{\lambda}$$

total amplitude of transmitted beam is $$U' = U_0(1-R_1)(1-R_2)(1 + R_1R_2e^{i\delta} + R_1^2R_2^2e^{2i\delta} + R_1^3R_2^3e^{3i\delta} + \ldots) = \frac{(1-R_1)(1-R_2)}{1+R_1R_2e^{i\delta}}U_0$$

Then transmittance of FP may be expressed as:

$$T = \frac{U'U'^*}{U_0 U_0^*} = \frac{(1-R_1)(1-R_2)}{(1-R_1R_2)^2 + 4\sqrt{R_1R_2}\sin^2\left(\frac{\delta}{2}\right)}$$

When the amplitude reflectivity of the two surfaces of the interferometer is equal, that is, $R_1=R_2$, and the intensity reflection of each surface is equal to $R=R_1^2$, the transmittance of FP may be simplified as:

$$T = \frac{1}{1 + \frac{4R}{(1-R)^2}\sin^2\left(\frac{\delta}{2}\right)}$$

It can be seen from the above expression that the transmittance T of the FP is related to cavity length, wavelength, and incident angle. Therefore, the transmittance curve of the FP etalon is generally measured by adjusting the wavelength of the incident light source or the angle of the incident light. However, laser sources with wavelength tuning function are very expensive, and it is difficult to find laser sources with a corresponding wide wavelength tuning range for some FP etalons with a wide free spectral range. In addition, the tuning of the wavelength and the angle of the incident light are both nonlinear, and the measurement accuracy is insufficient. Since the frequency comb light source has multiple frequency components with equal frequency intervals, it may measure the transmittance curve of the FP etalon at one time. And the frequency interval and spectral range are adjustable, avoiding the above-mentioned defects.

Figure 2:
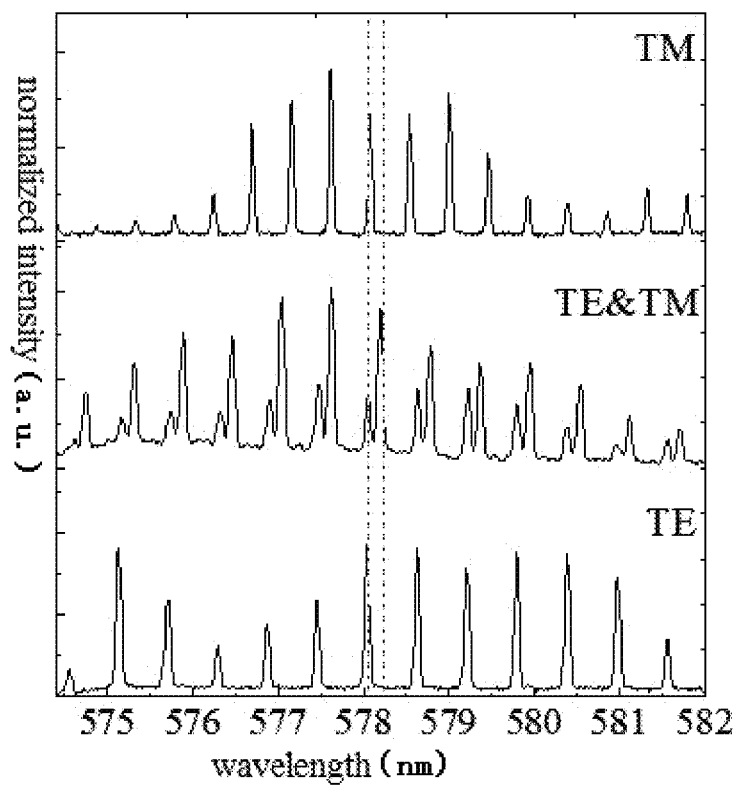
FIG. 2 is a schematic diagram of polarization information of whispering gallery laser corresponding to different incident polarizations.

2) Laser Characteristics of Whispering Gallery Mode Excited by Evanescent Waves in Microfluidics Optical frequency comb (OFC) refers to a spectrum composed of a series of frequency components, these components are evenly spaced, and have a coherent and stable phase relationship in the spectrum. But the frequency comb source is very expensive. In engineering applications, there is an urgent need for a light source that is similar to a frequency comb light source and may provide multiple frequency components, which is an economical and reliable light source. Whispering gallery mode lasers have characteristics similar to OFC of various frequency components, although the frequency intervals are not strictly equal, they may be accurately determined. Especially the laser source based on the whispering channel mode in the microfluidic chip. In addition to multiple frequency components, the range and frequency interval of frequency components may be changed by adjusting related parameters such as dye type, fiber diameter, and cladding solution refractive index. Since it may be integrated on the microfluidic chip, when different light source ranges or distances are needed, corresponding parameters in the microfluidic chip may be adjusted. For a larger adjustment range, it may also be achieved by directly redesigning a new microfluidic chip. Due to the low cost of this type of microfluidic chip, this solution may be easily promoted and applied. The following figure shows the spectrum of various frequency components of the whispering gallery mode obtained in the microfluidic chip. From the figure, we can see that there will be different polarization information of whispering gallery modes. In practical applications, the same polarization information as the microfluidic light source may be obtained by adjusting the polarization of the pump light. As shown in FIG. 2, polarization information of the whispering gallery laser corresponding to different incident polarizations is provided, N=1 mM, n2=1.362, E=42 uJ/mm2, which is divided into the spectrogram showing the radiation laser with only TM mode, the radiation laser with TM mode and TE mode and the radiation laser with only TE mode. This technical feature may be used for the research of FP depolarization.

This application provides a device and a method for measuring a transmittance curve of an FP etalon by using a laser source of a whispering gallery mode in a microfluidic chip. Since the whispering gallery mode light source may have multiple frequency components, although the frequency intervals are not completely equal, they are relatively accurately determined, so the transmittance curve of the FP etalon may be measured at one time, avoiding the above-mentioned defects. Based on the advantages of microfluidics, the frequency interval and spectral range of the light source are adjustable, and the cost is very low compared to other methods. By using the whispering gallery mode light source, multiple frequency components may be obtained at the same time, and the polarization of multiple frequency components may be changed at the same time, and the response of FP to polarization may be quickly measured. This method greatly reduces the cost of measuring the transmittance curve, improves the measurement accuracy and effectiveness, and provides a measurement method that may effectively measure the response of FP to the polarization characteristics, which has a good application prospect.

The overall scheme of the method is designed as:

1) first, designing a required whispering gallery mode laser source in a microfluidic chip according to requirements;

2) then introducing the laser source into the system that may be used to instantaneously measure the transmittance curve of FP through the optical fiber; and 3) measuring the transmittance curve of FP.

Figure 3:
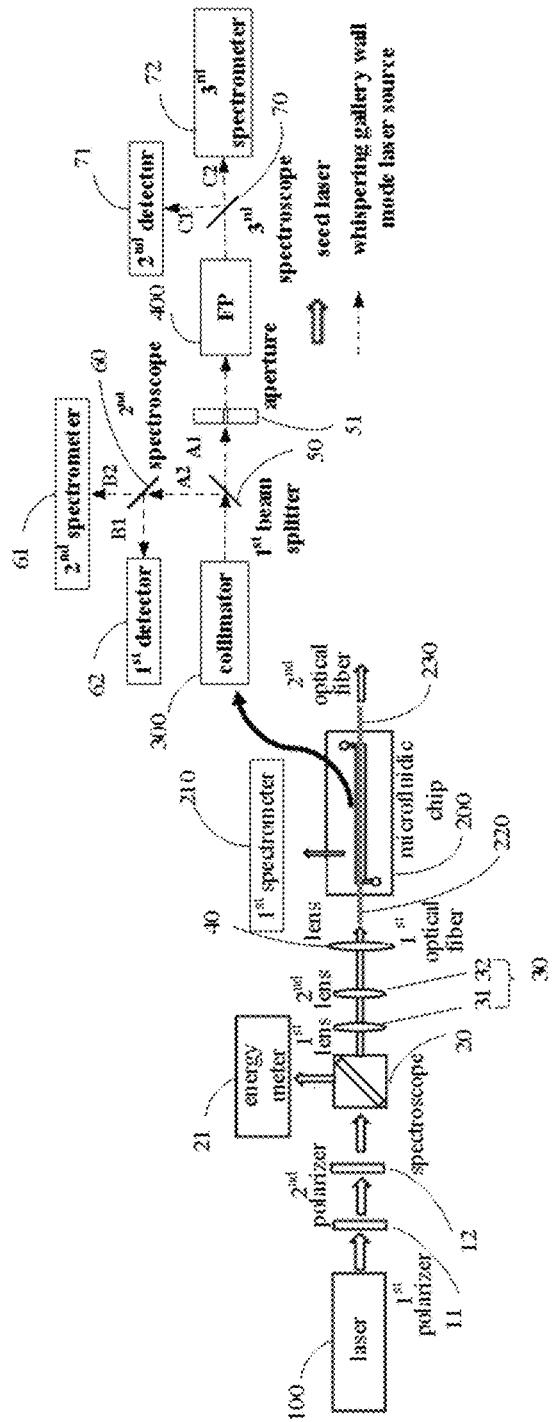
FIG. 3 is a schematic structural diagram of measuring a transmittance curve of the FP using a whispering gallery mode laser source in a microfluidic chip.

Specifically, as shown in FIG. 3, the device includes a seed laser, a first polarizer, a second polarizer, a spectroscope, a beam reduction system, a lens 3 and a PDMS arranged in sequence. The spectroscope is corresponded to an energy meter, and the beam reduction system is composed of a lens 1 and a lens 2. The PDMS is correspondingly provided with a first spectrometer; one end of the PDMS is preset with a first optical fiber, and the other end of the PDMS is preset with a second optical fiber; an end surface of the first optical fiber is corresponded to a lens 3; the second optical fiber is corresponded to a collimator, the collimator is corresponded to a first beam splitter, the first beam splitter is corresponded to a second beam splitter and an aperture, respectively, the second beam splitter is corresponded to a second spectrometer and a first detector, respectively, the aperture is corresponded to an FP, the FP is corresponded to a third beam splitter, and the third beam splitter is corresponded to a second detector and a third spectrometer, respectively.

Figure 4:
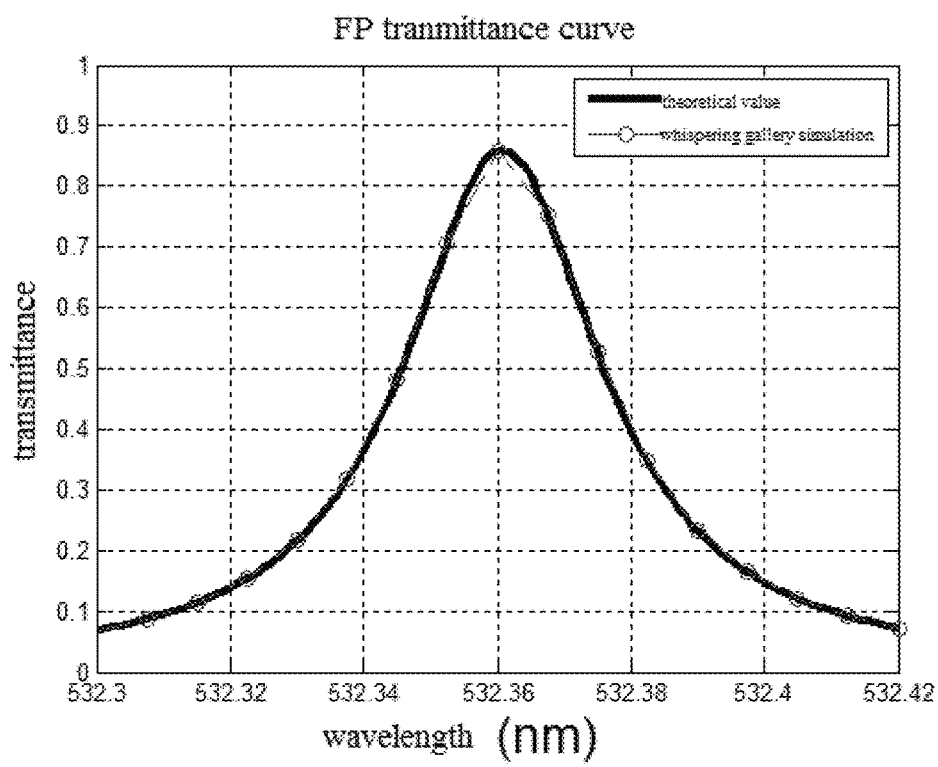
FIG. 4 is a comparison diagram of a measured transmittance curve using the Whispering Gallery Mode (WGM) mode and a theoretical transmittance curve.
Figure 5:
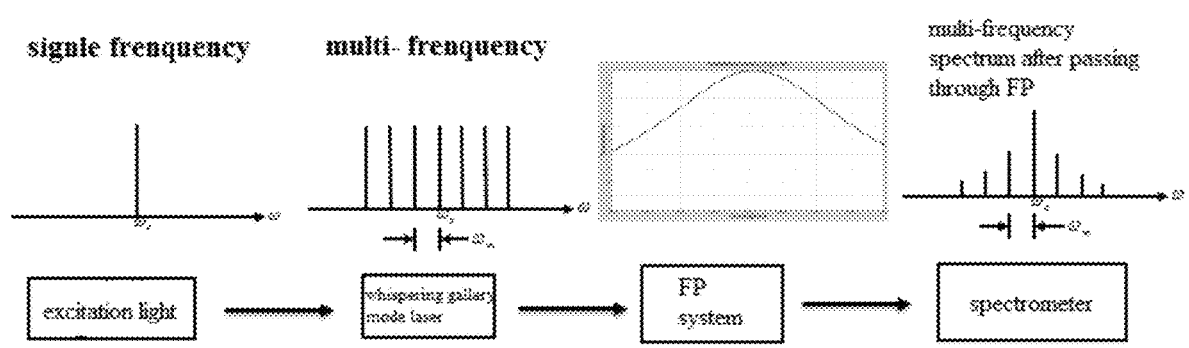
FIG. 5 is a schematic diagram of a frequency comb light source used for FP transmittance curve detection.

The specific method is: passing, laser emitted by the seed laser with a single frequency through the first polarizer 1 and the second polarizer 2 to adjust polarization of incident light; passing, the laser, through the spectroscope 0 to split a beam of light into the energy meter for monitoring energy of the incident light, passing, the laser from the spectroscope 0 through the beam reduction system composed of the lens 1 and the lens 2 and through the lens 3 to be focused on the end surface of the first optical fiber 1, where the first optical fiber 1 is preset into the PDMS, the microfluidic substrate is added with required dye, light propagating in the whispering gallery mode in the first optical fiber 1 is configured to generate whispering gallery mode laser by gain of the dye; monitoring, by the first detector 0 (spectrometer), the generated laser; in a determination that the generated laser is required whispering gallery mode laser, passing, the generated laser, through the second optical fiber 2 into a beam expansion system; splitting, by the first beam splitter, the generated laser into beam A1 and beam A2; splitting, by the second beam splitter, the beam A2 into beam B1 and beam B2; detecting, by the second spectrometer 1, a frequency component of the beam B2; and receiving, by the first detector 1, energy of the beam B1; passing, the beam A1, through the aperture, the third polarizer 3 and the FP etalon; splitting, by the third beam splitter 3, the beam into beam C1 and beam C2; detecting, by a third spectrometer 2, a frequency component of the beam C2; receiving, by the second detector 2, the beam C1, and measuring, by the second detector 2, energy of the beam C1. The energy changes of the first detector 0 and the second detector 1 are used for calibration, and then by comparing the relative energy changes of the corresponding frequency components before and after the FP, the transmittance of the corresponding frequency may be obtained. The transmission curve may be obtained by fitting each frequency component by a polynomial. FIG. 4 shows the comparison between the measured transmittance curve using the WGM mode and the theoretical transmittance curve. The black line represents the theoretical transmittance curve, and the circled line represents the transmittance curve obtained by the WGM laser described in this article. It can be seen from the figure that the two agree very well, and this method may theoretically fit the FP transmittance curve.

The above are only preferred embodiments of this application and are not intended to limit this application. Any modification, equivalent replacement and improvement made within the spirit and principle of this application should be included in the scope of protection of this application.

What is claimed is:

1. A device for measuring a transmittance curve of an Fabry-Parot etalon using a whispering gallery mode laser source, comprising: a seed laser, a first polarizer, a second polarizer, a spectroscope, a beam reduction system, a lens, and a Polydimethylsiloxane (PDMS) microfluidic chip arranged in sequence; the spectroscope is corresponded to an energy meter; the PDMS microfluidic chip is correspondingly provided with a first spectrometer; one end of the PDMS microfluidic chip is preset with a first optical fiber, and the other end of the PDMS microfluidic chip is preset with a second optical fiber; laser through the lens is focused to an end surface of the first optical fiber; the second optical fiber is corresponded to a collimator, the collimator is corresponded to a first beam splitter, the first beam splitter is corresponded to a second beam splitter and an aperture, respectively, the second beam splitter is corresponded to a second spectrometer and a first detector, respectively, the aperture is corresponded to the Fabry-Parot etalon, the Fabry-Parot etalon is corresponded to a third beam splitter, and the third beam splitter is corresponded to a second detector and a third spectrometer, respectively.

2. The device for measuring the transmittance curve of the Fabry-Parot etalon using the whispering gallery mode laser source according to claim 1, wherein the beam reduction system is composed of a first lens and a second lens.

3. A method for measuring a transmittance curve of an Fabry-Parot etalon using a whispering gallery mode laser source, comprising a device for measuring the transmittance curve of the Fabry-Parot etalon using the whispering gallery mode laser source, wherein the device comprises: a seed laser, a first polarizer, a second polarizer, a spectroscope, a beam reduction system, a lens, and a PDMS microfluidic chip arranged in sequence; the spectroscope is corresponded to an energy meter; the PDMS microfluidic chip is correspondingly provided with a first spectrometer; one end of the PDMS microfluidic chip is preset with a first optical fiber, and the other end of the PDMS microfluidic chip is preset with a second optical fiber; laser through the lens is focused to an end surface of the first optical fiber; the second optical fiber is corresponded to a collimator, the collimator is corresponded to a first beam splitter, the first beam splitter is corresponded to a second beam splitter and an aperture, respectively, the second beam splitter is corresponded to a second spectrometer and a first detector, respectively, the aperture is corresponded to the Fabry-Parot etalon, the Fabry-Parot etalon is corresponded to a third beam splitter, and the third beam splitter is corresponded to a second detector and a third spectrometer, respectively;

wherein the method comprises:

passing, laser emitted by the seed laser with a single frequency through the first polarizer and the second polarizer to adjust polarization of incident light;

passing, the laser, through the spectroscope to split a beam of light into the energy meter for monitoring energy of the incident light, passing the laser from the spectroscope through the beam reduction system composed of a first lens and a second lens and through the lens to be focused on the end surface of the first optical fiber, wherein the first optical fiber is preset into the PDMS microfluidic chip, the PDMS microfluidic chip is added with required dye, light propagating in the whispering gallery mode in the first optical fiber is configured to generate whispering gallery mode laser by gain of the dye;

monitoring, by the first spectrometer, the generated laser;

in a determination that the generated laser is required whispering gallery mode laser, passing the generated laser, through the second optical fiber into a beam expansion system;

splitting, by the first beam splitter, the generated laser into beam A1 and beam A2;

splitting, by the second beam splitter, the beam A2 into beam B1 and beam B2;

detecting, by the second spectrometer, a frequency component of the beam B2;

receiving, by the first detector, energy of the beam B1;

passing, the beam A1, through the aperture and the Fabry-Parot etalon;

splitting, by the third beam splitter, the beam A1 into beam C1 and beam C2;

detecting, by the third spectrometer, a frequency component of the beam C2;

receiving, by the second detector, the beam C1, and measuring, by the second detector, energy of the beam C1;

using energy changes of the first detector and the second detector for calibration;

comparing relative energy changes of corresponding frequency components before and after the Fabry-Parot etalon to obtain transmittance of corresponding frequency; and fitting each frequency component through a polynomial to obtain a transmission curve.

\* \* \* \* \*